(12) United States Patent
Oh et al.

(10) Patent No.: US 9,678,894 B2
(45) Date of Patent: Jun. 13, 2017

(54) CACHE-LESS SPLIT TRACKER ARCHITECTURE FOR REPLAY PROTECTION TREES

(71) Applicant: Intel Corporation, Santa Clara, CA (US)

(72) Inventors: Jungju Oh, San Jose, CA (US); Siddhartha Chhabra, Hillsboro, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 14/671,659

(22) Filed: Mar. 27, 2015

(65) Prior Publication Data

US 2016/0283405 A1    Sep. 29, 2016

(51) Int. Cl.
*G06F 12/14* (2006.01)
*G06F 21/60* (2013.01)

(52) U.S. Cl.
CPC ........ *G06F 12/1408* (2013.01); *G06F 21/602* (2013.01); *G06F 2212/1052* (2013.01)

(58) Field of Classification Search
CPC .............. G06F 12/1408; G06F 21/602; G06F 2212/1052
USPC .......................................................... 713/193
See application file for complete search history.

(56) References Cited

U.S. PATENT DOCUMENTS

| | | | | |
|---|---|---|---|---|
| 5,230,048 A | * | 7/1993 | Moy | G06F 17/30516 |
| 5,941,975 A | * | 8/1999 | Park | G06F 9/526 |
| | | | | 707/999.008 |
| 7,420,115 B2 | * | 9/2008 | Kawamoto | G10H 1/183 |
| | | | | 84/604 |
| 8,601,358 B2 | * | 12/2013 | Thiesfeld | G06F 11/10 |
| | | | | 714/763 |
| 8,738,919 B2 | * | 5/2014 | Bardouillet | G06F 11/1004 |
| | | | | 713/166 |
| 8,819,455 B2 | | 8/2014 | Chhabra et al. | |
| 8,977,898 B1 | * | 3/2015 | Veeraswamy | G06F 17/30227 |
| | | | | 714/15 |

(Continued)

FOREIGN PATENT DOCUMENTS

| | | | | |
|---|---|---|---|---|
| WO | WO 2013100964 A1 | * | 7/2013 | ........... H04L 9/0643 |
| WO | WO 2013100965 A1 | * | 7/2013 | ............. G06F 21/64 |

(Continued)

OTHER PUBLICATIONS

Brian Rogers, Siddhartha Chhabra, Yan Solihin; Using Address Independent Seed Encryption and Bonsai Merkle Trees to Make Secure Processors OS and Performance Friendly; 40th IEEE/ACM International Symposium on Microarchitecture.*

(Continued)

*Primary Examiner* — Yin-Chen Shaw
*Assistant Examiner* — Richard Cruz-Franqui
(74) *Attorney, Agent, or Firm* — Jordan IP Law, LLC (57) ABSTRACT

Systems, apparatuses and methods may provide for receiving an incoming request to access a memory region protected by counter mode encryption and a counter tree structure having a plurality of levels. Additionally, the incoming request may be accepted and a determination may be made as to whether to suspend the incoming request on a per-level basis with respect to the counter tree structure.

24 Claims, 8 Drawing Sheets

(56) References Cited

U.S. PATENT DOCUMENTS

| | | | |
|---|---|---|---|
| 9,021,303 B1* | 4/2015 | DeSouter | G06F 11/1417 |
| | | | 714/15 |
| 9,053,346 B2* | 6/2015 | Chhabra | G06F 21/64 |
| 9,092,644 B2* | 7/2015 | Narendra Trivedi | H04L 9/0643 |
| 9,223,789 B1* | 12/2015 | Seigle | G06F 17/30073 |
| 2006/0002555 A1 | 1/2006 | Lekatsas et al. | |
| 2009/0138714 A1* | 5/2009 | Matsushita | H04L 9/083 |
| | | | 713/171 |
| 2012/0278635 A1* | 11/2012 | Hars | G06F 12/14 |
| | | | 713/193 |
| 2014/0040632 A1* | 2/2014 | Chhabra | G06F 21/64 |
| | | | 713/189 |
| 2014/0101461 A1* | 4/2014 | Chhabra | G06F 12/1408 |
| | | | 713/193 |
| 2014/0208109 A1* | 7/2014 | Narendra Trivedi | H04L 9/0643 |
| | | | 713/170 |
| 2015/0026818 A1* | 1/2015 | Lee | H04M 3/42008 |
| | | | 726/26 |
| 2015/0067322 A1 | 3/2015 | Reddy et al. | |
| 2016/0048831 A1* | 2/2016 | Ongchin | G06Q 20/3821 |
| | | | 705/44 |

FOREIGN PATENT DOCUMENTS

| | | | | |
|---|---|---|---|---|
| WO | 2013110477 A1 | 8/2013 | | |
| WO | WO 2016153722 A1 * | 9/2016 | | G06F 21/78 |
| WO | WO 2016153728 A1 * | 9/2016 | | G06F 21/79 |
| WO | WO 2016160129 A1 * | 10/2016 | | G06F 12/1408 |

OTHER PUBLICATIONS

International Search Report and Written Opinion for International Application No. PCT/US2016/017150, mailed May 19, 2016, 12 pages.

* cited by examiner

FIG. 10

CACHE-LESS SPLIT TRACKER ARCHITECTURE FOR REPLAY PROTECTION TREES

TECHNICAL FIELD

Embodiments generally relate to data security. More particularly, embodiments relate to a cache-less split tracker architecture for replay protection trees.

BACKGROUND

The protection of sensitive information may be relevant to a wide variety of computing platforms ranging from personal computers (PCs) to servers. For example, without protection, an attacker with physical access to a platform may capture snapshots of encrypted sensitive data (e.g., banking login information) and replay the snapshots later in order to masquerade as a bona fide possessor of the sensitive data (e.g., in a "replay attack"). One approach to protecting against replay attacks may be to use counter mode encryption and a counter tree structure. With counter mode encryption, accessing sensitive data may be decoupled from the cryptographic work that encrypts the data (e.g., stored in cache lines). Instead of the sensitive data, a seed that is independent from the data may be encrypted to obtain a "cryptographic pad", which may be XORed with the cache line to obtain the final encryption. For spatial uniqueness, the address of the cache line may be used as a component of the seed and for temporal uniqueness, a per-line counter may be associated with each cache line, wherein the counter may be incremented on each write to the cache line in question.

To reduce space overhead associated with storing the counter values, a counter tree structure may be used, wherein only top level root counters are stored on-chip in SRAM (static random access memory). In such a solution, each node in the counter tree may correspond to a cache line that holds multiple counters and carries a message authentication code (MAC) that is embedded in the cache line (e.g., "eMAC"). An eMAC at a given level in the counter tree may be generated from a corresponding counter value at the next highest level in the tree. Thus, as read and/or write requests are received, a "tree walk" may be conducted in which tree nodes are loaded into a centralized internal cache for verification of the request. During the tree walk, a centralized tracker may be used to monitor dependencies between pending requests. The centralized tracker may lack scalability because different types of platforms may use varying numbers of tree levels to cover different protected memory sizes. Moreover, requests that conflict at any level of the tree may be suspended upon receipt even though the requests may potentially be completed before the conflicting nodes are reached during the tree walk.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
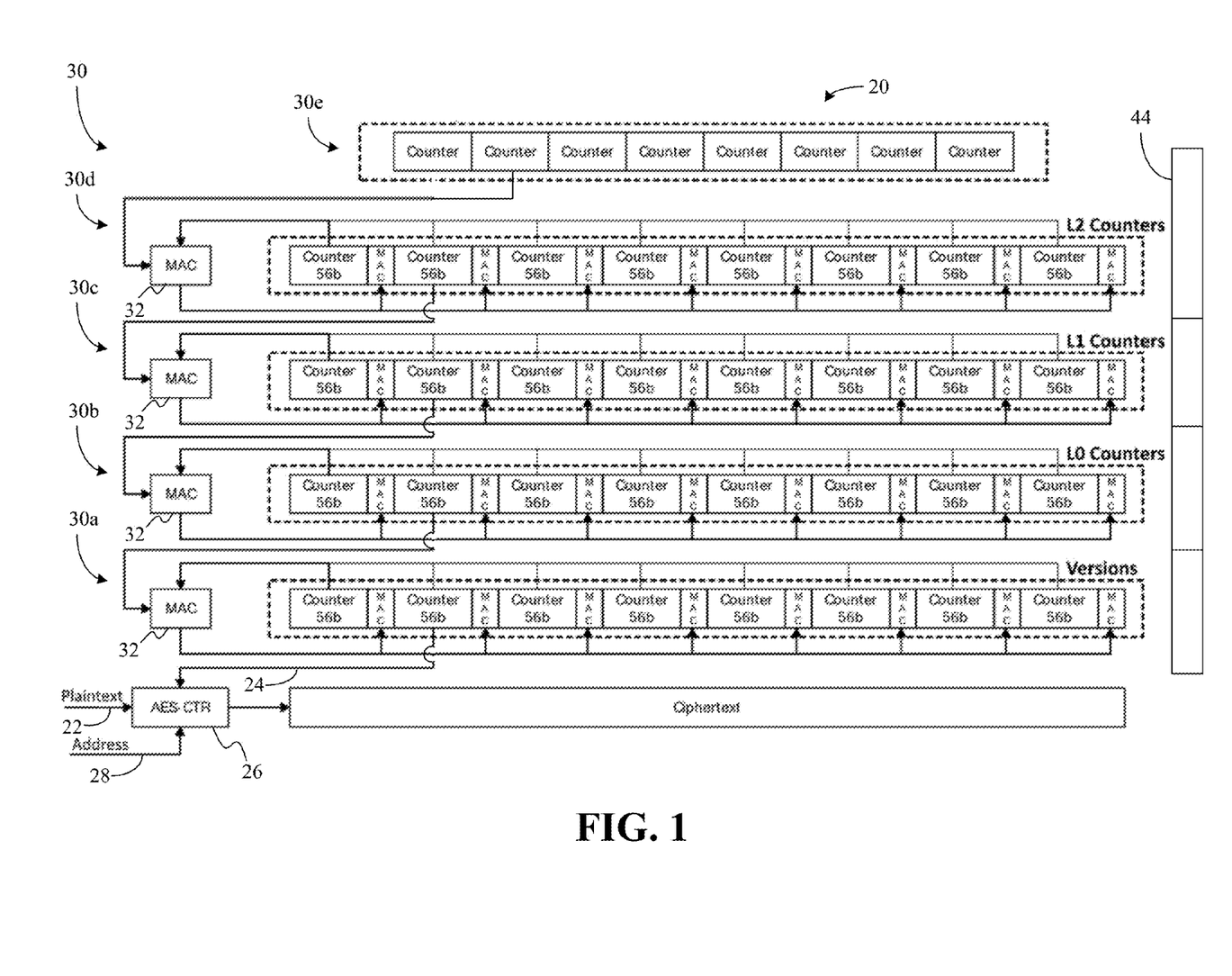
FIG. 1 is a block diagram of an example of a counter tree structure according to an embodiment.

Turning now to FIG. 1, a counter tree structure 20 (e.g., replay protection tree) is shown. In general, the counter tree structure 20 has a plurality of levels 30 (30a-30e) and may be used in conjunction with counter mode encryption to protect sensitive data 22 (e.g., "plaintext") such as, for example, banking login information, account information, and so forth. Additionally, a split tracker architecture 44 may receive incoming requests (e.g., read requests, write requests) to access the sensitive data 22 in a memory region protected by the counter mode encryption and the counter tree structure 20, accept the incoming requests, and determine whether to suspend the incoming requests on a per-level basis with respect to the counter tree structure 20. In the illustrated example, a seed 24 is used by a cryptography component 26 (e.g., Advance Encryption Standard Counter Mode/AES-CTR) to encrypt the data 22. The encryption and decryption of the counter mode operation may be summarized as follows.

Cryptopad=$AES_k$(Seed)
Ciphertext=Plaintext$\oplus$Cryptopad [encrypt]
Plaintext=Ciphertext$\oplus$Cryptopad [decrypt]

The security of the counter mode encryption may provide for the seed 24 to be unique in terms of spatial and temporal nature in order to prevent attackers from inferring the plaintext. For example, there might be two encrypted messages $C_1$ and $C_2$ associated with plaintext messages $Plain_1$ and $Plain_2$, respectively, $C_1$=$Plain_1$$\oplus$Cryptopad;
$C_2$=$Plain_2$$\oplus$Cryptopad;

$$C1 \oplus C2 = (Plain_1 \oplus Cryptopad) \oplus (Plain_2 \oplus Cryptopad);$$
$$= Plain_1 \oplus Plain_2.$$

If the same cryptographic pad were to be used in the encryption, attacks that capture the ciphertext $C_1$ and $C_2$ may infer either of the plaintext messages $Plain_1$ and $Plain_2$, given either one of the plaintext messages. Therefore, the illustrated counter tree structure 20 ensures that data from two different locations does not use the same seed (e.g., spatial uniqueness), and that for the same location, no data uses the same seed twice in its encryption (e.g., temporal uniqueness). For spatial uniqueness, an address 28 of the data line may be used as a component of the seed. For temporal uniqueness, per-line counters (e.g., 56 bit counters) may be used, wherein each per-line counter is associated with a particular data line and is incremented on each write to the data line in question. The value of the per-line counter may therefore represent the version of the data line and may be protected from adversaries.

To reduce space overhead, each node (e.g., 56 bit counter and corresponding message authentication code/MAC) in the counter tree structure 20 may correspond to a data line that holds multiple counters. In the illustrated example, a version level 30a of the counter tree structure 20 represents the lowest level of the hierarchy, wherein the seed 24 may be the counter value for a particular node (e.g., second node from the left in the example shown) at the version level 30a. For that particular node, a MAC generator 32 may use the counter values from the version level 30a and the corresponding counter value for that node at a first level 30b (e.g., next highest level "L0") to generate a MAC for all of the nodes at the version level 30a (e.g., the corresponding data line).

Similarly, a MAC generator 32 at the first level 30b may use the counter values from the first level 30b and the corresponding counter value for that node at a second level 30c (e.g., next highest level "L1") to generate a MAC for all of the nodes at the first level 30b, a MAC generator 32 at the second level 30c may use the counter values from the second level 30c and the corresponding counter value for that node at a third level 30d (e.g., next highest level "L2") to generate a MAC for all of the nodes at the second level 30c, and so forth. A top level 30e of the counter tree structure 20 may contain the root counter values that are stored in a protected area of the semiconductor package (e.g., trusted on-chip SRAM). As will be discussed in greater detail, the counter values of the lower levels 30a-30d may each be loaded into a buffer (e.g., flip-flop, register file, etc.) in the split tracker architecture 44 that is dedicated to the level in question. Such an approach may enable elimination of conventional memory encryption caches.

Figure 2:
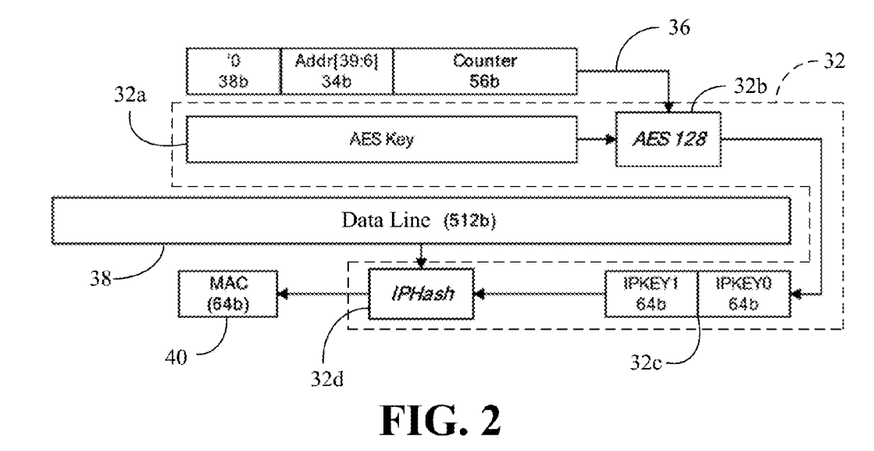
FIG. 2 is a block diagram of an example of a message authentication code generator according to an embodiment.

FIG. 2 shows one example of the MAC generator 32 (32a-32d) in which an encryptor 32b (e.g., 128 bit AES encryptor) uses a key 32a (e.g., AES key) to encrypt a counter value 36 from the next highest level in a counter tree structure such as the counter tree structure 20 (FIG. 1). The encryption result 32c (e.g., IPKey1, IPKey2) may then be applied to a hash function 32d that XORs the encryption result 32c with the counter values 38 from the data line of the current level of the counter tree structure. The result of the hash function 32d may be a MAC 40 that is used to validate access requests at the current level of the counter tree structure. As will be discussed in greater detail, the decision whether to suspend incoming requests may be made on a per-level basis with respect to the counter tree structure.

Figure 3:
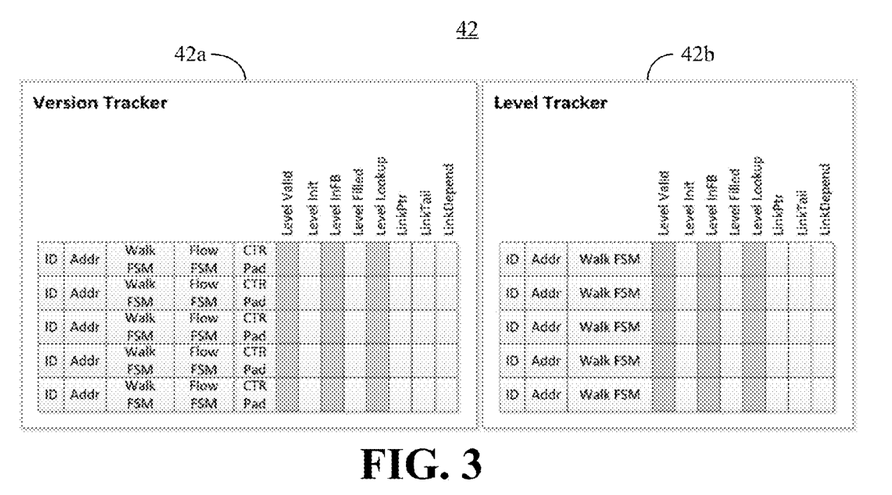
FIG. 3 is an illustration of an example of a split tracker data structure according to an embodiment.

Turning now to FIG. 3, a split tracker data structure 42 (42a-42b) for a counter tree structure is shown in which a version data structure 42a tracks the status of incoming requests at a version level such as, for example, the version level 30a (FIG. 1) and a level data structure 42b tracks the status of incoming requests at higher levels such as, for example, the levels 30b-30e (FIG. 1), already discussed. Thus, the level data structure 42b may be duplicated for each higher level in the counter tree structure. In the illustrated example, the level data structure 42b documents a request identifier (ID), address and tree walk finite state machine (FSM) status for each incoming message.

The illustrated level data structure 42b also tracks whether the following state bits are set for a given request: level valid (e.g., whether the current level of the request is valid), level initialized (e.g., whether the current level of the request has been initialized), level in fill buffer (InFB) (e.g., whether the data of current level of the request is in the fill buffer), level filled (e.g., whether the current level of the request is updated in the buffer), level lookup (e.g., whether the current level of the request has been looked up from the buffer), link pointer (e.g., the previous request in a suspension linked list), link tail (e.g., whether the request is the last element of the suspension linked list), and link dependent (e.g., whether the next request in the suspension linked list may proceed). Because a version tracker (described in greater detail below) may control the overall progress of incoming requests, the illustrated version data structure 42a documents a flow FSM status, and counter (CTR) pad value for each incoming message in addition to the information documented and tracked by the level data structure 42b.

Figure 4:
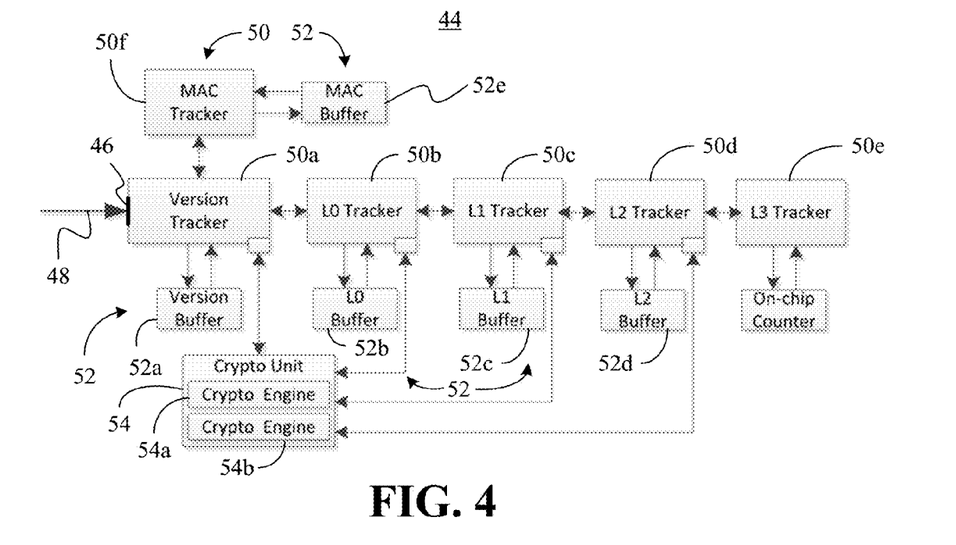
FIG. 4 is a block diagram of an example of a split tracker architecture according to an embodiment.

FIG. 4 shows one example of the split tracker architecture 44 that may be used to selectively suspend incoming requests (e.g., read requests, write requests) on a per-level basis with respect to a counter tree structure such as, for example, the counter tree structure 20 (FIG. 1). In the illustrated example, an interface 46 (e.g., port, input) may receive an incoming request 48 to access a memory region protected by counter mode encryption and the counter tree structure, which has a plurality of levels. A plurality of trackers 50 (50a-50f) may generally accept the incoming request 48 and determine whether to suspend the incoming request on a per-level basis with respect to the counter tree structure. The plurality of trackers 50 may use a corresponding plurality of buffers 52 (52a-52d, e.g., flip-flops, register files) to process the incoming request 48, wherein the buffers 52 may load data (e.g., counter values, MACs) from the counter tree structure. More particularly, a version tracker 50a may conduct a version search of a version buffer 52a for data (e.g., counter values) corresponding to the incoming request. In addition, a MAC tracker 50f may conduct a code search of a MAC buffer 52e for data (e.g., MACs) corresponding to the incoming request 48.

If the version search and/or the code search is unsuccessful, the version tracker 50a may pass the incoming request 48 to a first level tracker 50b (e.g., "L0 Tracker"). The first level tracker 50b may conduct a dependency check at the first level, wherein the dependency check may involve comparing the incoming request 48 to a linked list that is dedicated to the first level. The illustrated first level tracker 50b suspends the incoming request 48 if the dependency check indicates that the incoming request 48 shares a node of the first level with an in-process request. If the dependency check indicates that the incoming request 48 does not share a node of the first level with an in-process request, the first level tracker 50b may then search a first buffer 52b (e.g., "L0 Buffer") for data (e.g., counter values, MACs) corresponding to the incoming request 48, wherein the first buffer 52b is dedicated to the first level of the counter tree structure. If the data is not found in the first buffer 52b, authentication of the access may be deemed unsuccessful at the first level of the counter tree structure and the first level tracker 50b may pass the incoming request 48 to a second level tracker 50c (e.g., "L1 Tracker").

The second level tracker 50c, which may be identical to the first level tracker 50b, may conduct a dependency check at the second level. The dependency check may involve comparing the incoming request 48 to a linked list that is dedicated to the second level. The illustrated second level tracker 50c suspends the incoming request 48 if the dependency check indicates that the incoming request 48 shares a node of the second level with an in-process request. If the dependency check indicates that the incoming request 48 does not share a node of the second level with an in-process request, the second level tracker 50c may search a second buffer 52c (e.g., "L1 Buffer") for data (e.g., counter values, MACs) corresponding to the incoming request 48, wherein the second buffer 52c is dedicated to the second level of the counter tree structure. If the data is not found in the second buffer 52c, authentication of the access may be deemed unsuccessful at the second level of the counter tree structure and the second level tracker 50c may pass the incoming request 48 to a third level tracker 50d (e.g., "L2 Tracker"). The process may repeat depending on the number of levels in the split tracker architecture 44, wherein configuring the upper level trackers 50b-50e identically may render the illustrated solution as highly scalable from system on chip (SoC, e.g., PC) platforms to servers and beyond.

Thus, if a read request hits in, for example, a third buffer 52d dedicated to the third level tracker 50d, nodes for version, MAC, L0 and L1 may be fetched from memory, with their embedded MAC (eMAC) being generated using a cryptography unit 54 (54a-54b), discussed in greater detail below. Once the eMACs are verified, the data lines for version, MAC, L0 and L1 may be updated in their corresponding buffers and the finite state machine may move to the data decryption state.

Configuring the buffers 52 as flip-flops ("flops") and/or register files may enable the buffers 52 to exhibit much faster access latency than a conventional cache. For example, in certain platforms that use a centralized memory encryption cache, cache access latency for a read request might be four cycles and fill latency is may be seven cycles. By replacing the memory encryption cache with register files, read and fill accesses may be completed in one cycle. Flops may have much better access latency in that they can access the contents in the same cycle. Moreover, by providing each tracker 50 with a dedicated buffer 52, the illustrated split tracker architecture 44 enables the buffers 52 to only communicate with one tracker 50 and the interface can be simpler.

In addition to the latency benefit, the dedicated buffers 52 may eliminate a thrashing issue potentially caused by sharing a centralized memory encryption cache. More particularly, with the size of metadata being reduced by ⅛ for each level, the total size of higher levels may become much smaller than the version metadata. Thus, with a shared cache, version counters that take up much space may cause evictions of the higher-level counters. This phenomenon may reduce the effect of caching as the cache starts to fail in providing the higher-level counters when they are needed.

In the illustrated the dedicated buffers 52, however, version counter values may only reside in their own buffer, allowing the higher-level counter values such as L1 or L2 counter values to remain in their buffer 52 safely even if the version counter accesses show an access pattern that degrades cache efficiency. Indeed, the size of the buffers 52 may be much smaller than a centralized memory encryption cache. For example, buffers with only thirty-two entries per level (160 entries in total) may exhibit similar performance with a centralized 64 KB cache that has 1024 lines. Even if the buffers 52 consume more space than a cache, 85% entry savings may provide substantial benefits due to the superior access latency of the buffers 52.

As already noted, the illustrated split tracker architecture 44 also includes the cryptography unit 54, which has a plurality of cryptography components (e.g., "Crypto Engines"). Each of the cryptography components may be independently configurable to conduct the counter mode encryption in support of the different levels of the split tracker architecture 44. For example, if the split tracker architecture 44 is deployed in a server with relatively high cryptography bandwidth needs, a first cryptography component 54a may be dedicated to the first level tracker 50b, a second cryptography component 54b may be dedicated to the second level tracker 50c, and so forth, so that bottlenecks associated with cryptographic accesses are minimized. If, on the other hand, the split tracker architecture 44 is deployed in an SoC platform (e.g., PC, handheld computer, etc.), the first cryptography component 54a might support the plurality of trackers 50 in order to achieve greater power efficiency and occupy less space (e.g., chip real estate). Thus, the illustrated cryptography unit 54 may further enhance the scalability of the split tracker architecture 44.

Figure 5A:
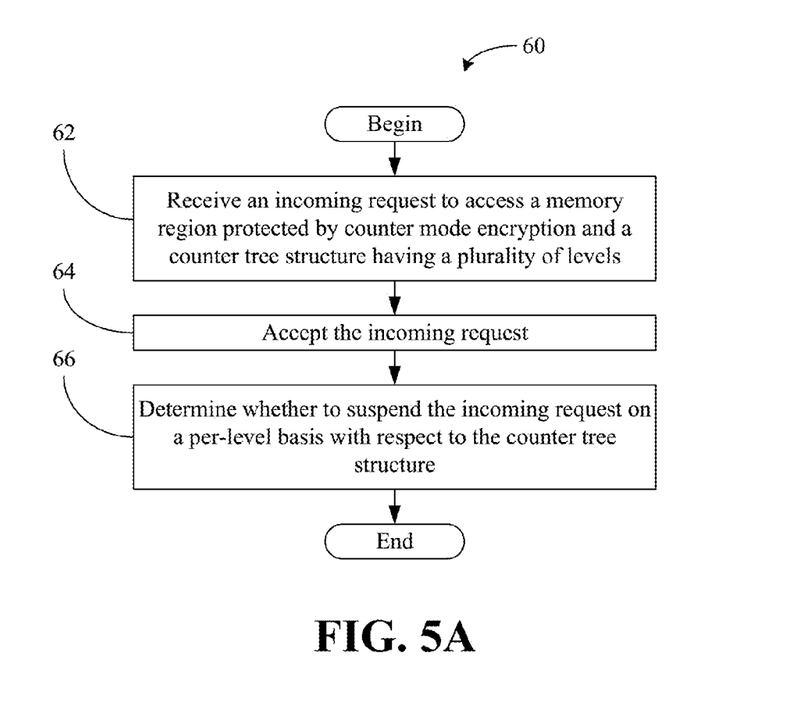
FIG. 5A is a flowchart of an example of a method of handling requests to access protected data according to an embodiment.

FIG. 5A shows a method 60 of handling requests to access protected data. The method 60 may generally be implemented in a split tracker architecture such as, for example, the split tracker architecture 44 (FIGS. 1 and 4), already discussed. More particularly, the method 60 may be implemented as a module or related component in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages.

Illustrated processing block 62 provides for receiving an incoming request to access a memory region protected by counter mode encryption and a counter tree structure having a plurality of levels. The incoming request may include one or more of a read request or a write request. The incoming request may be accepted at block 64, wherein block 66 may determine whether to suspend the incoming request on a per-level basis with respect to the counter tree structure. In one example, one or more of a plurality of cryptography components is used to conduct the counter mode encryption.

Figure 5B:
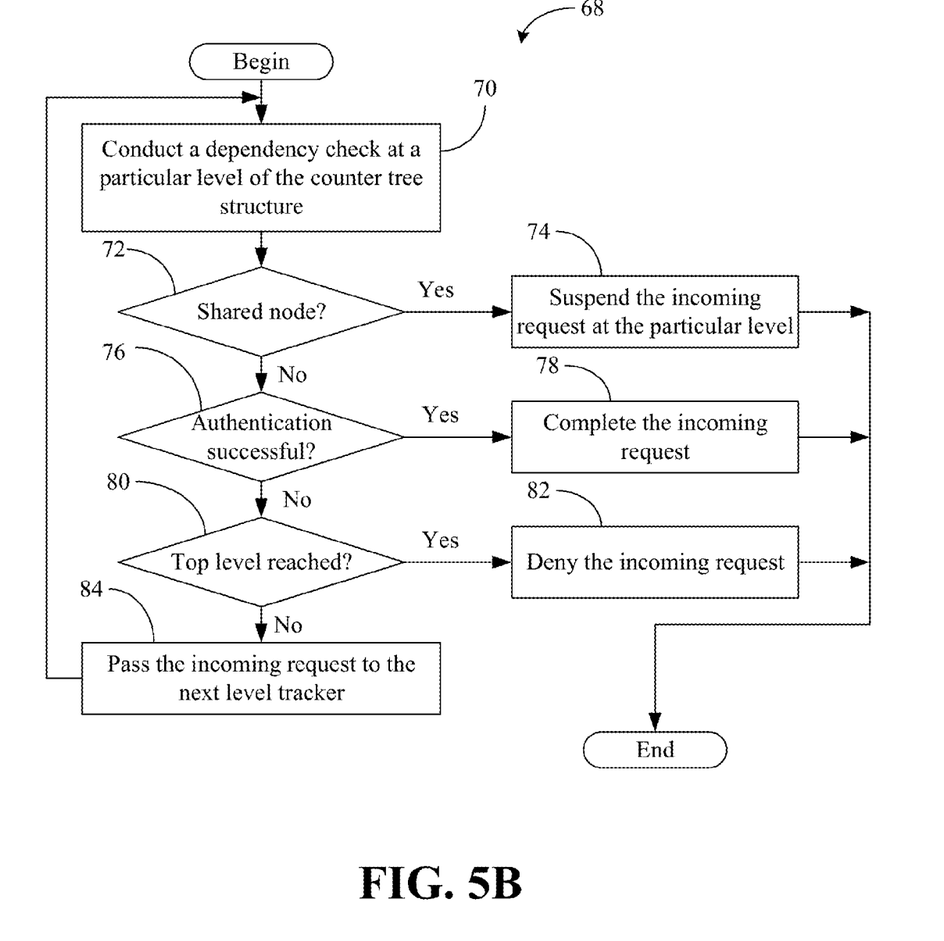
FIG. 5B is a flowchart of an example of a method of determining whether to suspend an incoming request according to an embodiment.

Turning now to FIG. 5B, a method 68 of determining whether to suspend an incoming request on a per-level basis is shown. The method 68, which may be readily substituted for block 66 (FIG. 5A), already discussed, may generally be implemented in a tracker such as, for example, one or more of the plurality of trackers 50 (FIG. 4), already discussed. More particularly, the method 68 may be implemented as a module or related component in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 70 provides for conducting (e.g., by a first level tracker) a dependency check at a particular level of a counter tree structure. A determination may be made at block 72 as to whether the dependency check indicates that the incoming request shares a node of the particular level with an in-process request. If so, block 74 may suspend the incoming request at the particular level. Otherwise, a determination may be made at block 76 as to whether authentication of the access of the memory region was successful at the level in question. If authentication of the access was successful, the incoming request may be completed at block 78. If authentication of the access was not successful at the level in question, illustrated block 80 determines whether the top level of the counter tree structure has been reached. Block 82 may deny the incoming request if the top level of the counter tree structure has been reached. Otherwise, the incoming request may be passed to the next level tracker at block 84.

Figure 6:
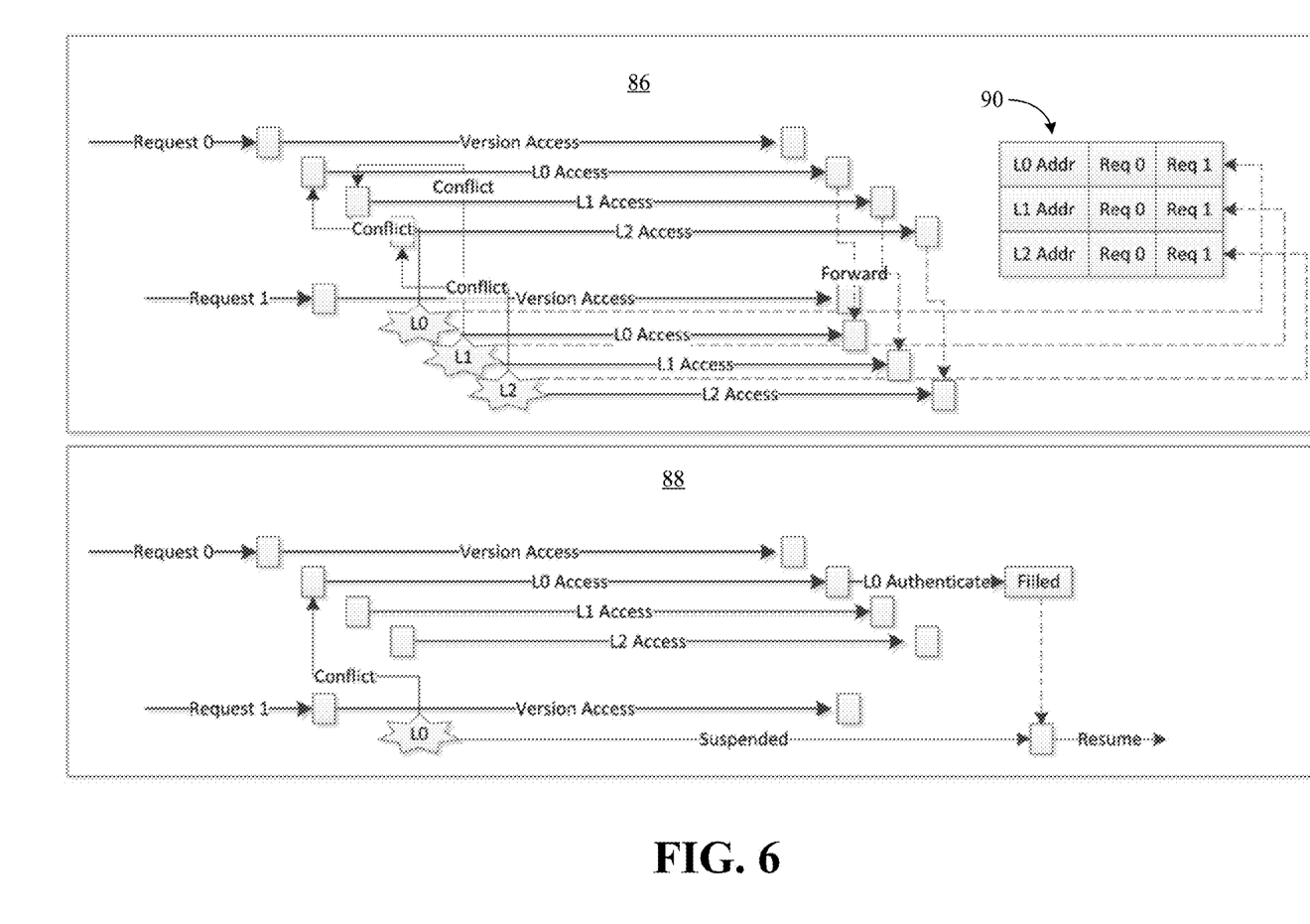
FIG. 6 is an illustration of an example of a comparison between a conventional access request scenario and an access request scenario according to an embodiment.

FIG. 6 shows a comparison between a conventional access request scenario 86 and an enhanced access request scenario 88 that deploys techniques described herein. In general, the conventional access request scenario 86 allows multiple read requests to issue memory accesses to the memory for missing levels independently. Therefore, if "Request 0" and "Request 1" share a node at level L0, duplicated L0, L1 and L2 memory accesses are generated. As a result, the conventional access request scenario 86 may use a miss buffer 90 to filter the duplicated memory requests. On the other hand, the enhanced access request scenario 88 may use a split tracker architecture such as, for example, the split tracker architecture 44 (FIG. 4), to check the conflict at each level. If there is a conflict, per-level suspension logic may suspend the request instead of allowing the request to proceed. In the enhanced access request scenario 88, Request 1 is blocked (e.g., suspended) after the version access because there is an L0 conflict with the on-going Request 0. Since the conflicting request is blocked, there will be no duplicated memory accesses and the illustrated miss buffer 90, which increases complexity and on-chip cost, may be eliminated. The blocked request may be released and resumes its process when the conflicting level is filled into the buffer.

Figure 7:
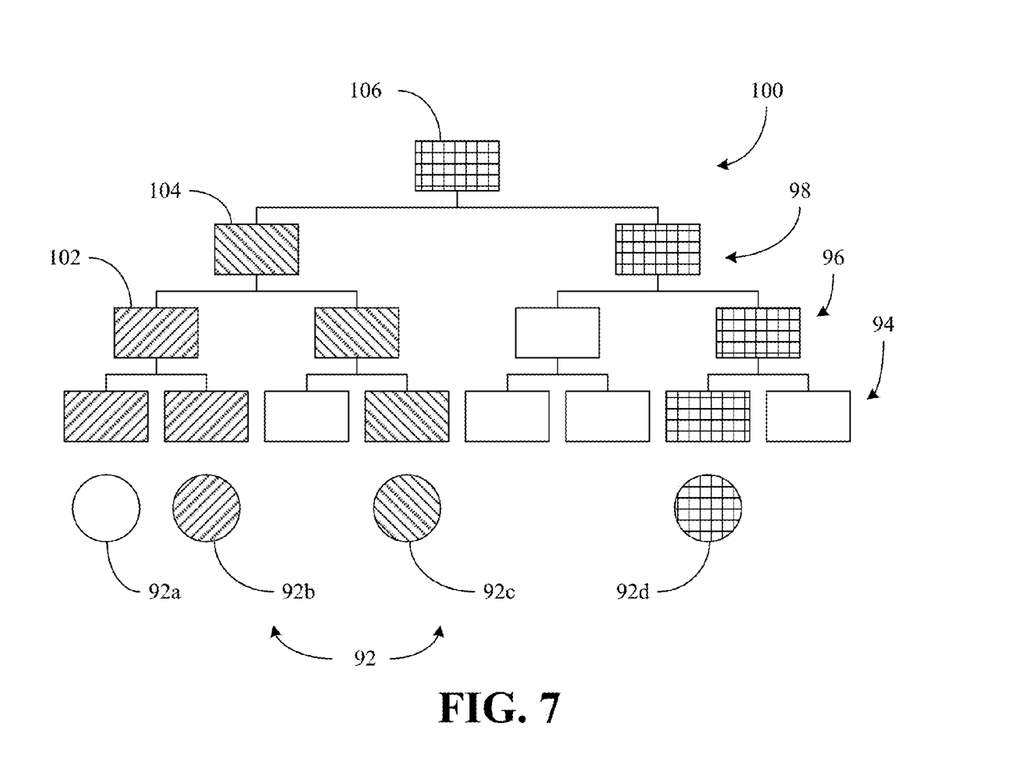
FIG. 7 is an illustration of an example of a node sharing scenario according to an embodiment.

FIG. 7 shows a node sharing scenario in which a counter tree structure has a version level 94, a first level 96, a second level 98 and a third level 100. In the illustrated example, there are four requests 92 (92a-92d), and one or more of them may be a write request. A first request 92a and a second request 92b share a node 102 at the first level 96, the first request 92a and a third request 92c share a node 104 in the second level 98, and the first request 92a and fourth request 92d share a node 106 in the third level 100. Using per-level suspension as described herein enables the second request 92b to proceed through the version level 94 while the first request 92a is being processed because the requests 92a, 92b only share the first level 96.

Figure 8:
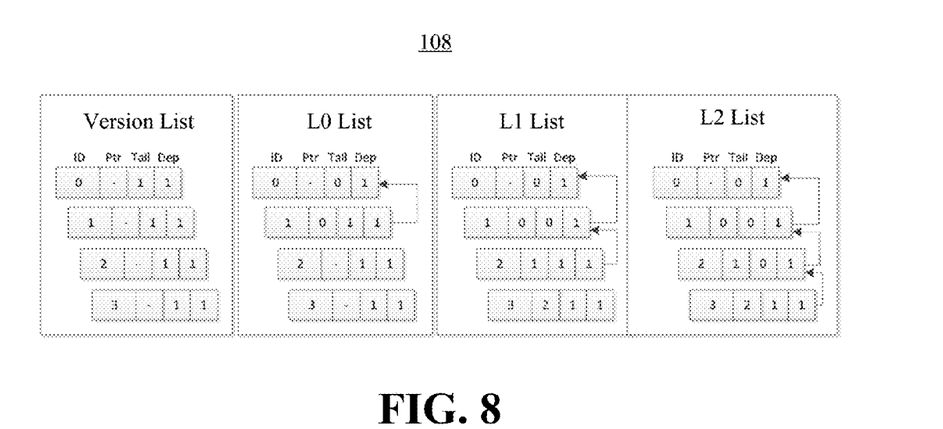
FIG. 8 is an illustration of an example of a set of linked lists according to an embodiment.

With continuing reference to FIGS. 7 and 8, a set of linked lists 108 demonstrates that in the version tracker, there is no suspension linked list formed but the L0 tracker has constructed one linked list with the second request 92b "chasing" the first request 92a. When the third request 92c is received, it may proceed through the version level 94 and the first level 96. Of particular note is that the third request 92c is not linked to any other request at level L0. When the fourth request 92d is received, it may proceed to the node 106 at the third level 100 node until it conflicts with the first request 92a. In other words, the fourth request 92d may be processed at the version level 94, the first level 96, and the second level 98 without any blocking or suspension. As a result, performance may be substantially improved.

Figure 9:
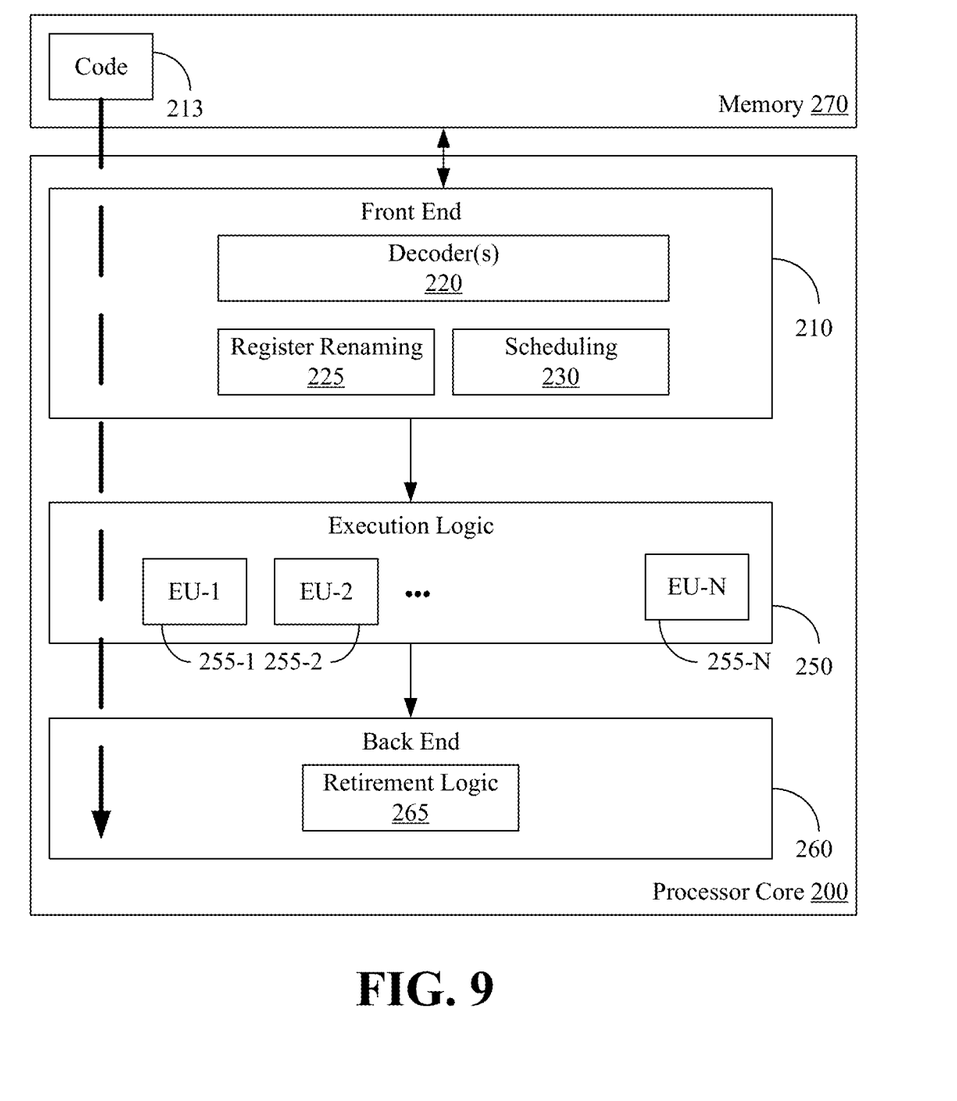
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 60 (FIG. 5A) and/or the method 68 (FIG. 5B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
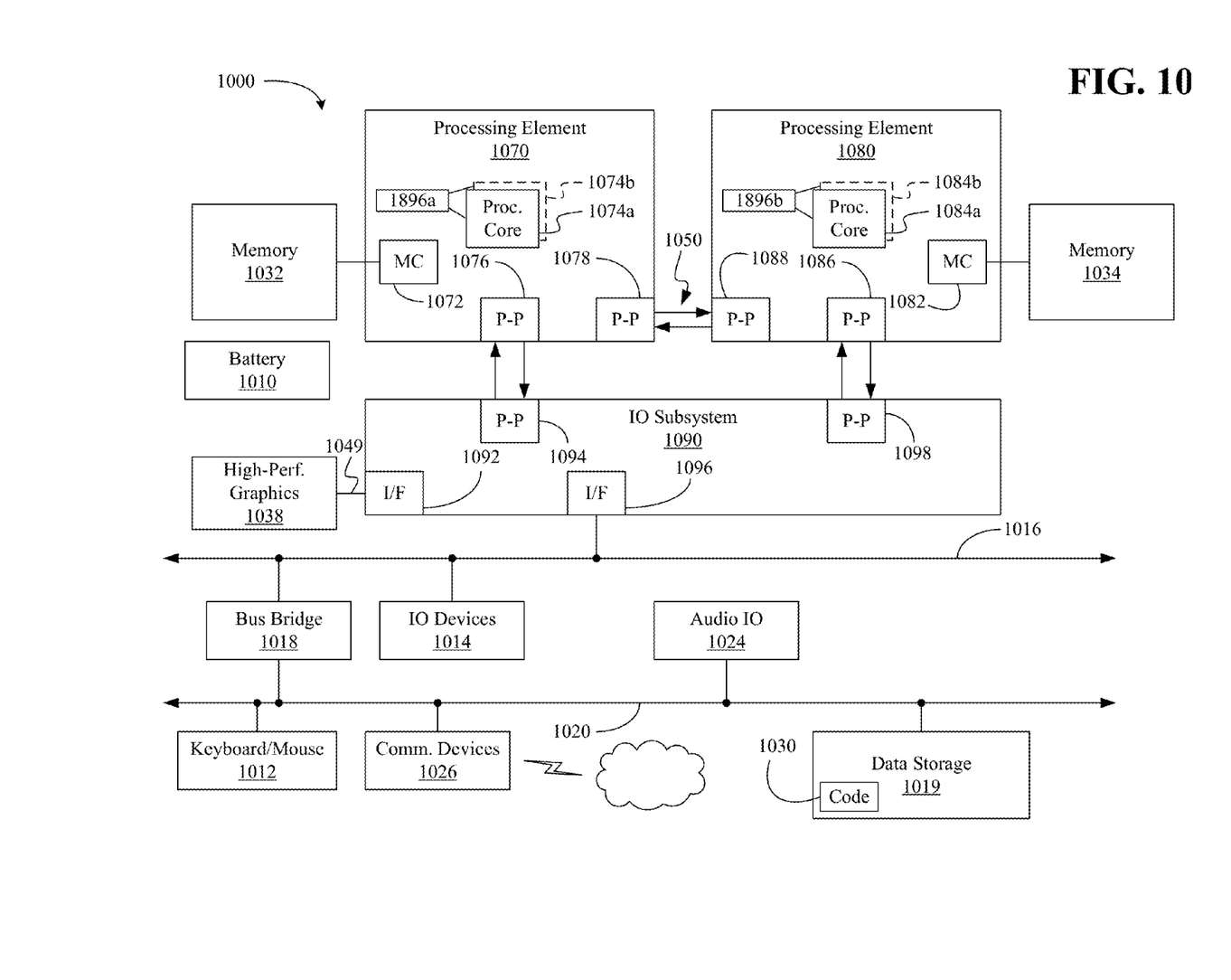
FIG. 10 is a block diagram of an example of a computing system according to an embodiment.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 60 (FIG. 5A) and/or the method 68 (FIG. 5B), already discussed, and may be similar to the code 213 (FIG. 9), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

Additional Notes and Examples:

Example 1 may include a data protection apparatus comprising an interface to receive an incoming request to access a memory region protected by counter mode encryption and a counter tree structure having a plurality of levels and a plurality of trackers to accept the incoming request and determine whether to suspend the incoming request on a per-level basis with respect to the counter tree structure.

Example 2 may include the apparatus of Example 1, wherein the plurality of trackers includes a first level tracker and a second level tracker, wherein the first level tracker is to conduct a first dependency check at a first level of the counter tree structure, suspend the incoming request if the dependency check indicates that the incoming request shares a node of the first level with an in-process request, pass the incoming request to the second level tracker if the dependency check indicates that the incoming request does not share a node of the first level with an in-process request and authentication of the access is unsuccessful at the first level, and complete the incoming request if authentication of the access is successful at the first level.

Example 3 may include the apparatus of Example 2, further including a first buffer dedicated to the first level, and a second buffer dedicated to a second level of the counter tree structure, wherein the first level tracker is to search the first buffer for data corresponding to the incoming request to determine whether authentication of the access is successful at the first level.

Example 4 may include the apparatus of Example 2, wherein the first level tracker is to compare the incoming request to a linked list that is dedicated to the first level to conduct the first dependency check.

Example 5 may include the apparatus of Example 2, further including a version buffer, and message authentication code buffer, wherein the plurality of trackers includes a version tracker to conduct a version search of the version buffer for data corresponding to the incoming request and a message authentication code tracker to conduct a code search of the message authentication code buffer for data corresponding to the incoming request, and wherein the version tracker is to pass the incoming request to the first level tracker if one or more of the version search or the code search is unsuccessful.

Example 6 may include the apparatus of Example 2, wherein the first level tracker and the second level tracker are identical.

Example 7 may include the apparatus of Example 1, further including a plurality of cryptography components to conduct the counter mode encryption.

Example 8 may include the apparatus of any one of Examples 1 to 7, wherein the incoming request is to include one or more of a read request or a write request.

Example 9 may include a method of handling requests to access protected data, comprising receiving an incoming request to access a memory region protected by counter mode encryption and a counter tree structure having a plurality of levels, accepting the incoming request, and determining whether to suspend the incoming request on a per-level basis with respect to the counter tree architecture.

Example 10 may include the method of Example 9, further including conducting, by a first level tracker, a first dependency check at a first level of the counter tree structure, suspending the incoming request if the dependency check indicates that the incoming request shares a node of the first level with an in-process request, passing the incoming request to a second level tracker if the dependency check indicates that the incoming request does not share a node of the first level with an in-process request and authentication of the access is unsuccessful at the first level, and completing the incoming request if authentication of the access is successful at the first level.

Example 11 may include the method of Example 10, further including searching a buffer dedicated to the first level for data corresponding to the incoming request to determine whether authentication of the access is successful at the first level.

Example 12 may include the method of Example 10, wherein conducting the first dependency check includes comparing the incoming request to a linked list that is dedicated to the first level.

Example 13 may include the method of Example 10, further including conducting, by a version tracker, a version search of a version buffer for data corresponding to the incoming request, conducting, by a message authentication code tracker, a code search of a message authentication code buffer for data corresponding to the incoming request, and passing the incoming request to the first level tracker if one or more of the version search or the code search is unsuccessful.

Example 14 may include the method of Example 10, wherein the first level tracker and the second level tracker are identical.

Example 15 may include the method of Example 9, further including using one or more of a plurality of cryptography components to conduct the counter mode encryption.

Example 16 may include the method of any one of Examples 9 to 15, wherein the incoming request includes one or more of a read request or a write request.

Example 17 may include at least one computer readable storage medium comprising a set of instructions, which when executed by a computing device, cause the computing device to receive an incoming request to access a memory region protected by counter mode encryption and a counter tree structure having a plurality of levels, accept the incoming request, and determine whether to suspend the incoming request on a per-level basis with respect to the counter tree structure.

Example 18 may include the at least one computer readable storage medium of Example 17, wherein the instructions, when executed, cause the computing device to conduct, by a first level tracker, a first dependency check at a first level of the counter tree structure, suspend the incoming request if the dependency check indicates that the incoming request shares a node of the first level with an in-process request, pass the incoming request to a second level tracker if the dependency check indicates that the incoming request does not share a node of the first level with an in-process request and authentication of the access is unsuccessful at the first level, and complete the incoming request if authentication of the access is successful at the first level.

Example 19 may include the at least one computer readable storage medium of Example 18, wherein the instructions, when executed, cause the computing device to search a buffer dedicated to the first level for data corresponding to the incoming request to determine whether authentication of the access is successful at the first level.

Example 20 may include the at least one computer readable storage medium of Example 18, wherein the instructions, when executed, cause the computing device to compare the incoming request to a linked list that is dedicated to the first level to conduct the first dependency check.

Example 21 may include the at least one computer readable storage medium of Example 18, wherein the instructions, when executed, cause the computing device to conduct, by a version tracker, a version search of a version buffer for data corresponding to the incoming request, conduct, by a message authentication code tracker, a code search of a message authentication code buffer for data corresponding to the incoming request, and pass the incoming request to the first level tracker if one or more of the version search or the code search is unsuccessful.

Example 22 may include the at least one computer readable storage medium of Example 18, wherein the first level tracker and the second level tracker are to be identical.

Example 23 may include the at least one computer readable storage medium of Example 17, wherein the instructions, when executed, cause the computing device to use one or more of a plurality of cryptography components to conduct the counter mode encryption.

Example 24 may include the at least one computer readable storage medium of any one of Examples 17 to 23, wherein the incoming request is to include one or more of a read request or a write request.

Example 25 may include a data protection apparatus comprising means for receiving an incoming request to access a memory region protected by counter mode encryption and a counter tree structure having a plurality of levels, means for accepting the incoming request, and means for determining whether to suspend the incoming request on a per-level basis with respect to the counter tree structure.

Example 26 may include the apparatus of Example 25, further including means for conducting, by a first level tracker, a first dependency check at a first level of the counter tree structure, means for suspending the incoming request if the dependency check indicates that the incoming request shares a node of the first level with an in-process request, means for passing the incoming request to a second level tracker if the dependency check indicates that the incoming request does not share a node of the first level with an in-process request and authentication of the access is unsuccessful at the first level, and means for completing the incoming request if authentication of the access is successful at the first level.

Example 27 may include the apparatus of Example 26, further including means for searching a buffer dedicated to the first level for data corresponding to the incoming request to determine whether authentication of the access is successful at the first level.

Example 28 may include the apparatus of Example 26, wherein the means for conducting the first dependency check includes means for comparing the incoming request to a linked list that is dedicated to the first level.

Example 29 may include the apparatus of Example 26, further including means for conducting, by a version tracker, a version search of a version buffer for data corresponding to the incoming request, means for conducting, by a message authentication code tracker, a code search of a message authentication code buffer for data corresponding to the incoming request, and means for passing the incoming request to the first level tracker if one or more of the version search or the code search is unsuccessful.

Example 30 may include the apparatus of Example 26, wherein the first level tracker and the second level tracker are identical.

Example 31 may include the apparatus of Example 25 further including means for using one or more of a plurality of cryptography components to conduct the counter mode encryption.

Example 32 may include the apparatus of any one of Examples 25 to 31, wherein the incoming request is to include one or more of a read request or a write request.

Thus, techniques described herein may replace a centralized tracker with per-level split tracker. The per-level split tracker may modularize tracker state management and dependency checking logic so that they can be easily replicated when adding more replay-protection tree levels. The per-level dependency checking logic may provide an advanced suspension solution that defers the suspension of requests until they reach the conflicting tree level. Additionally, a buffer-based per-level storage solution may replace a centralized memory encryption cache. The buffers may provide much lower latency in accessing their contents. Furthermore, the per-level buffer that separates the data storage between levels may result in better performance with less space by preventing thrashing between version/MAC and other levels. In addition, techniques described herein may scale easily from SoCs to servers.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
an interface to receive an incoming request to access a memory region protected by counter mode encryption and a counter tree structure having a plurality of levels;
a plurality of trackers, implemented at least partly in one or more of configurable logic or fixed-functionality hardware logic, to accept the incoming request and determine whether to suspend the incoming request on a per-level basis with respect to the counter tree structure,
wherein the plurality of trackers includes a first level tracker and a second level tracker,
wherein the first level tracker is to conduct a first dependency check at a first level of the counter tree structure and to pass the incoming request to the second level tracker when the first dependency check indicates that the incoming request lacks a shared node at the first level with the in-process request and authentication of the access is unsuccessful at the first level, wherein the plurality of trackers use one or more buffers, the one or more buffers comprising one or more of register files or flip-flops to complete read and fill accesses in one cycle, wherein the first level tracker is to suspend the incoming request when the first dependency check indicates that the incoming request shares the node of the first level with an in-process request, and wherein authentication of the access includes conducting a code search of a message authentication code buffer for data corresponding to the incoming request.

2. The apparatus of claim 1, wherein the first level tracker is to complete the incoming request when authentication of the access is successful at the first level.

3. The apparatus of claim 2, wherein the one or more buffers include:
a first buffer dedicated to the first level; and
a second buffer dedicated to a second level of the counter tree structure, wherein the first level tracker is to search the first buffer for data corresponding to the incoming request to determine whether authentication of the access is successful at the first level.

4. The apparatus of claim 2, wherein the first level tracker is to compare the incoming request to a linked list that is dedicated to the first level to conduct the first dependency check.

5. The apparatus of claim 2, wherein the one or more buffers include:
a version buffer; and
the message authentication code buffer, wherein the plurality of trackers includes a version tracker to conduct a version search of the version buffer for data corresponding to the incoming request and a message authentication code tracker to conduct the code search of the message authentication code buffer for data corresponding to the incoming request, and wherein the version tracker is to pass the incoming request to the first level tracker when one or more of the version search or the code search is unsuccessful.

6. The apparatus of claim 2, wherein the first level tracker and the second level tracker are identical.

7. The apparatus of claim 1, further including a plurality of cryptography components to conduct the counter mode encryption.

8. The apparatus of claim 1, wherein the incoming request is to include one or more of a read request or a write request.

9. A method comprising:
receiving an incoming request to access a memory region protected by counter mode encryption and a counter tree structure having a plurality of levels;
accepting the incoming request;
conducting, by a first level tracker, a first dependency check at a first level of the counter tree structure and
passing the incoming request to a second level tracker when the first dependency check indicates that the incoming request lacks a shared node at the first level with an in-process request and authentication of the access is unsuccessful at the first level, wherein the plurality of trackers use one or more buffers, the one or more buffers comprising one or more of register files or flip-flops to complete read and fill accesses in one cycle;
determining whether to suspend the incoming request on a per-level basis with respect to the counter tree structure; and
suspending the incoming request when the first dependency check indicates that the incoming request shares the node of the first level with an in-process request,
wherein authentication of the access includes conducting a search of a buffer dedicated to the first level for data corresponding to the incoming request to determine whether authentication of the access is successful at the first level.

10. The method of claim 9, further including:
completing the incoming request when authentication of the access is successful at the first level.

11. The method of claim 10, wherein the one or more buffers include the buffer dedicated to the first level.

12. The method of claim 10, wherein conducting the first dependency check includes comparing the incoming request to a linked list that is dedicated to the first level.

13. The method of claim 10, further including:
conducting, by a version tracker, a version search of a version buffer for data corresponding to the incoming request;
conducting, by a message authentication code tracker, a code search of a message authentication code buffer for data corresponding to the incoming request; and
passing the incoming request to the first level tracker when one or more of the version search or the code search is unsuccessful, wherein the one or more buffers include one or more of the version buffer or the message authentication code buffer.

14. The method of claim 10, wherein the first level tracker and the second level tracker are identical.

15. The method of claim 9, further including using one or more of a plurality of cryptography components to conduct the counter mode encryption.

16. The method of claim 9, wherein the incoming request includes one or more of a read request or a write request.

17. At least one non-transitory computer readable storage medium comprising a set of instructions, which when executed by a computing device, cause the computing device to:
receive an incoming request to access a memory region protected by counter mode encryption and a counter tree structure having a plurality of levels;
accept the incoming request;
conduct, by a first level tracker, a first dependency check at a first level of the counter tree structure and
pass the incoming request to a second level tracker when the first dependency check indicates that the incoming request lacks a shared node at the first level with an in-process request and authentication of the access is unsuccessful at the first level, wherein the plurality of trackers use one or more buffers, the one or more buffers comprising one or more of register files or flip-flops to complete read and fill accesses in one cycle;
determine whether to suspend the incoming request on a per-level basis with respect to the counter tree structure; and
suspend the incoming request when the first dependency check indicates that the incoming request shares the node of the first level with an in-process request,
wherein authentication of the access includes conducting a search of a buffer dedicated to the first level for data corresponding to the incoming request to determine whether authentication of the access is successful at the first level.

18. The at least one computer readable storage medium of claim 17, wherein the instructions, when executed, cause the computing device to:

complete the incoming request when authentication of the access is successful at the first level.

19. The at least one computer readable storage medium of claim 18, wherein the one or more buffers include the buffer dedicated to the first level.

20. The at least one computer readable storage medium of claim 18, wherein the instructions, when executed, cause the computing device to compare the incoming request to a linked list that is dedicated to the first level to conduct the first dependency check.

21. The at least one computer readable storage medium of claim 18, wherein the instructions, when executed, cause the computing device to:

conduct, by a version tracker, a version search of a version buffer for data corresponding to the incoming request;

conduct, by a message authentication code tracker, a code search of a message authentication code buffer for data corresponding to the incoming request; and pass the incoming request to the first level tracker when one or more of the version search or the code search is unsuccessful, wherein the one or more buffers include one or more of the version buffer or the message authentication code buffer.

22. The at least one computer readable storage medium of claim 18, wherein the first level tracker and the second level tracker are to be identical.

23. The at least one computer readable storage medium of claim 17, wherein the instructions, when executed, cause the computing device to use one or more of a plurality of cryptography components to conduct the counter mode encryption.

24. The at least one computer readable storage medium of claim 17, wherein the incoming request is to include one or more of a read request or a write request.

* * * * *